(12) United States Patent
Tang

(10) Patent No.: US 11,277,828 B2
(45) Date of Patent: Mar. 15, 2022

(54) METHOD, DEVICE AND SYSTEM FOR RESOURCE ALLOCATION, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignees: GUANGDONG OPPO MOBILE, Dongguan (CN); TELECOMMUNICATIONS CORP., LTD., Dongguan (CN)

( * ) Notice: Subject to any disclaimer, the term of this patent is extended or adjusted under 35 U.S.C. 154(b) by 169 days.

(21) Appl. No.: 16/631,771

(22) PCT Filed: Aug. 11, 2017

(86) PCT No.: PCT/CN2017/097143
§ 371 (c)(1),
(2) Date: Jan. 16, 2020

(87) PCT Pub. No.: WO2019/028848
PCT Pub. Date: Feb. 14, 2019

(65) Prior Publication Data
US 2020/0187174 A1    Jun. 11, 2020

(51) Int. Cl.
*H04W 72/04* (2009.01)
*H04W 76/27* (2018.01)
(Continued)

(52) U.S. Cl.
CPC ......... *H04W 72/042* (2013.01); *H04L 5/0053* (2013.01); *H04W 28/0278* (2013.01);
(Continued)

(58) Field of Classification Search
CPC ............ H04L 5/0053; H04W 28/0278; H04W 72/042; H04W 72/1268; H04W 72/1284; H04W 72/14; H04W 76/27
See application file for complete search history.

(56) References Cited

U.S. PATENT DOCUMENTS 10,383,165 B2 *   8/2019   Babaei ................. H04L 5/0098
10,582,413 B2 *   3/2020   Babaei ................. H04W 24/08
(Continued)

FOREIGN PATENT DOCUMENTS

CN    101998246 A    3/2011
CN    102685914 A    9/2012
(Continued)

OTHER PUBLICATIONS

3GPP TSG-RAN WG2 #96 Tdoc R2-168659; Reno, Nevada, USA, Nov. 14-18, 2016.
(Continued)

*Primary Examiner* — Eric Nowlin
(74) *Attorney, Agent, or Firm* — Young Basile Hanlon & MacFarlane, P.C.

(57) ABSTRACT

A method, device and system for resource allocation, and a computer-readable storage medium are provided. The method comprises: receiving downlink control information (DCI) sent by a base station, the DCI being used for identifying an uplink grant resource allocated to a user equipment (UE) by the base station; and when the uplink grant resource is a target resource, transmitting data of a target logical channel in a first logical channel by first using the uplink grant resource, wherein the target logical channel is a logical channel that is configured with only one transmission characteristic, and the target resource is an uplink grant resource of which the corresponding transmission
(Continued)

characteristic is the same as the transmission characteristic configured for the target logical channel.

16 Claims, 4 Drawing Sheets

(51) Int. Cl.
    *H04L 5/00*         (2006.01)
    *H04W 28/02*      (2009.01)
    *H04W 72/12*       (2009.01)
    *H04W 72/14*       (2009.01)

(52) U.S. Cl.
    CPC ... *H04W 72/1268* (2013.01); *H04W 72/1284* (2013.01); *H04W 72/14* (2013.01); *H04W 76/27* (2018.02)

(56) References Cited

U.S. PATENT DOCUMENTS

| | | | | |
|---|---|---|---|---|
| 10,602,495 | B2* | 3/2020 | Yi | H04W 72/121 |
| 10,736,116 | B2* | 8/2020 | Park | H04L 5/0064 |
| 10,798,732 | B2* | 10/2020 | Park | H04W 72/14 |
| 11,013,041 | B2* | 5/2021 | Stauffer | H04W 72/042 |
| 11,102,672 | B2* | 8/2021 | Babaei | H04W 24/08 |
| 11,122,612 | B2* | 9/2021 | Jeon | H04W 72/042 |
| 2017/0134960 | A1 | 5/2017 | Zhang | |
| 2017/0353972 | A1* | 12/2017 | Babaei | H04L 5/0098 |
| 2018/0007669 | A1* | 1/2018 | Yi | H04W 72/121 |
| 2018/0048498 | A1* | 2/2018 | Stern-Berkowitz | H04L 5/0048 |
| 2018/0270698 | A1* | 9/2018 | Babaei | H04W 24/08 |
| 2018/0368133 | A1* | 12/2018 | Park | H04W 72/048 |
| 2018/0368175 | A1* | 12/2018 | Jeon | H04W 72/04 |
| 2019/0124684 | A1* | 4/2019 | Folke | H04W 72/14 |
| 2019/0246420 | A1* | 8/2019 | Park | H04W 72/0433 |
| 2019/0394785 | A1* | 12/2019 | He | H04L 1/0023 |
| 2020/0059345 | A1* | 2/2020 | Pelletier | H04L 1/1657 |
| 2020/0170035 | A1* | 5/2020 | Lee | H04W 72/1242 |
| 2020/0178295 | A1* | 6/2020 | Xu | H04W 72/0446 |
| 2020/0187174 | A1* | 6/2020 | Tang | H04W 72/042 |
| 2020/0196185 | A1* | 6/2020 | Babaei | H04W 72/1284 |
| 2020/0196343 | A1* | 6/2020 | Marinier | H04W 72/1289 |
| 2020/0267753 | A1* | 8/2020 | Adjakple | H04W 72/1226 |
| 2020/0314814 | A1* | 10/2020 | Baek | H04L 1/1877 |
| 2021/0022174 | A1* | 1/2021 | Park | H04W 72/14 |
| 2021/0153176 | A1* | 5/2021 | Lee | H04W 72/14 |
| 2021/0176696 | A1* | 6/2021 | Sebire | H04L 5/0091 |
| 2021/0211993 | A1* | 7/2021 | Liu | H04W 52/54 |
| 2021/0212108 | A1* | 7/2021 | Lou | H04W 72/1257 |
| 2021/0298052 | A1* | 9/2021 | Namba | H04W 72/1278 |
| 2021/0337538 | A1* | 10/2021 | Li | H04L 1/1861 |

FOREIGN PATENT DOCUMENTS

| | | | | |
|---|---|---|---|---|
| CN | 106961741 A | | 7/2017 | |
| CN | 110754126 A | * | 2/2020 | H04L 5/00 |
| CN | 110800362 A | * | 2/2020 | H04W 72/14 |
| CN | 111836389 A | * | 10/2020 | |
| EP | 3622764 A1 | * | 3/2020 | H04W 72/1268 |
| EP | 3622764 A4 | * | 4/2020 | H04L 5/00 |
| MX | 2019012650 A | * | 2/2020 | H04W 72/1242 |
| RU | 2736577 C1 | * | 11/2020 | H04W 72/1242 |
| WO | WO-2015122701 A1 | * | 8/2015 | H04L 5/0053 |
| WO | 2017127126 A1 | | 7/2017 | |
| WO | WO-2017127126 A1 | * | 7/2017 | H04W 72/1278 |
| WO | WO-2018198011 A1 | * | 11/2018 | H04W 72/14 |
| WO | WO-2018231020 A1 | * | 12/2018 | H04L 5/0053 |
| WO | WO-2019033431 A | * | 2/2019 | H04W 72/10 |
| WO | WO-2020144403 A1 | * | 7/2020 | H04W 72/1242 |
| WO | WO-2020148122 A1 | * | 7/2020 | H04W 72/14 |

OTHER PUBLICATIONS

3GPP TSG-RAN2 Meeting #98; Hangzhou, China, May 15-19, 2017 R21704053.
3GPP TSG-RAN WG2 NR AH#2 R2-1706681; Qingdao, P.R. China, Jun. 27-29, 2017.
3GPP TSG-RAN WG2 NR AH#2 R2-1706682; Qingdao, P.R. China, Jun. 27-29, 2017.
3GPP TSG-RAN WG2 #98-AH Tdoc R2-1707119; Qingdao, P.R. of China, Jun. 27-29, 2017.
Extended EP Search Report for EP application 17921223.8 dated Apr. 7, 2020.
European First Examination Report for EP Application 17921223.8 dated Mar. 19, 2021. (7 pages).
India First Examination Report for IN Application 201917051796 dated Jan. 29, 2021. (6 pages).
InterDigital Inc., Logical Channel Selection Restrictions in LCP, 3GPP TSG-RAN WG2 NR AH#2, R2-1706681, Jun. 27-29, 2017. (4 pages).
InterDigital Inc., LCP for LCHs with Multiple RRC Configured Mappings, 3GPP TSG-RAN WG2 NR AH#2, R2-1706682, Jun. 27-29, 2017 (4 pages).
Ericsson, Logical Channel Prioritization and Transmission Profiles, 3GPP TSG-RAN WG2 #98-AH, R2-1707119, Jun. 27-29, 2017. (4 pages).

* cited by examiner

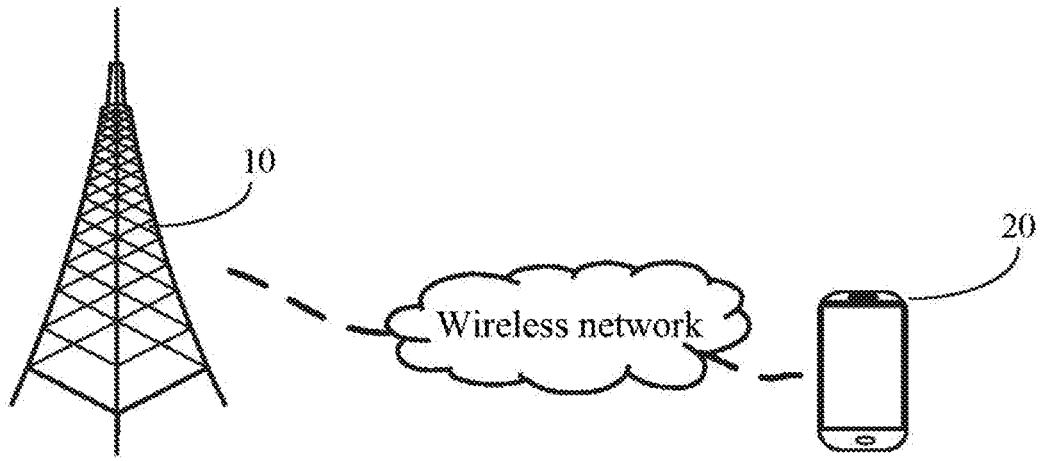

FIG. 1

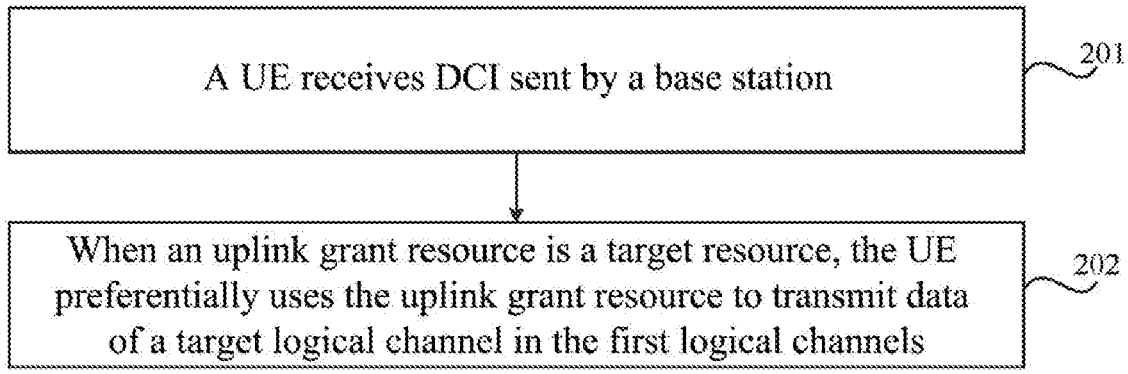

FIG. 2

A base station sends DCI to a UE, the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource ~301

FIG. 3

METHOD, DEVICE AND SYSTEM FOR RESOURCE ALLOCATION, AND COMPUTER-READABLE STORAGE MEDIUM

CROSS-REFERENCE TO RELATED APPLICATION(S)

This application is a 371 application of International Application No. PCT/CN2017/097143, filed on Aug. 11, 2017, the entire disclosure of which is hereby incorporated by reference.

TECHNICAL FIELD

The present disclosure relates to a field of communication, in particular to a method, apparatus, system for resource allocation and a computer-readable storage medium.

BACKGROUND

In a communication system, a User Equipment (UE) needs to send an uplink scheduling request to a base station before sending uplink data. Upon receiving the uplink scheduling request, the base station may allocate an uplink grant resource to the UE. After being allocated the uplink grant resource, the UE may map data in at least one logical channel to the uplink grant resource to transmit the uplink data to the base station through the uplink grant resource.

In a process of implementing the present disclosure, inventors found that the related art has at least the following problems.

In a Fifth Generation Mobile Communication Technology (5G) communication system, physical layer transmission parameters of different uplink grant resources are likely to be different. Due to the different physical layer transmission parameters of the uplink grant resources, data in different logical channels need to be carried through different types of uplink grant resources. In a practical application, data in some logical channels (referred to herein as a logical channel A) may be carried through multiple types of uplink grant resources, while data in other logical channels (referred to herein as a logical channel B) can be carried through only one type of uplink grant resource. In this case, if one type of uplink grant resource carries both data of the logical channel A and data of the logical channel B, the data of the logical channel A will affect data transmission of the logical channel B, resulting in lower Quality of Service (QoS) of services corresponding to the data of the logical channel B.

SUMMARY

In order to solve the problem that Quality of Service (QoS) of services of a logical channel in which data can be carried through only one type of uplink grant resource is lower, the present disclosure provides a method, apparatus, system for resource allocation and a computer readable storage medium. Technical solutions are as follows.

In a first aspect, a method for resource allocation is provided, the method including: receiving downlink control information (DCI) sent by a base station, wherein the DCI is used for identifying an uplink grant resource allocated by the base station to a User Equipment (UE), the uplink grant resource corresponds to one transmission profile, the uplink grant resource is used for carrying data of first logical channels, and transmission profiles configured for the first logical channels include the transmission profile corresponding to the uplink grant resource; and when the uplink grant resource is a target resource, preferentially using the uplink grant resource to transmit data of a target logical channel in the first logical channels; wherein the target logical channel is a logical channel configured with only one transmission profile, and the target resource is an uplink grant resource with a corresponding transmission profile being the same as a transmission profile configured for the target logical channel.

Optionally, the method further includes: determining that the uplink grant resource is the target resource when a channel identifier corresponding to the uplink grant resource is included in the DCI; wherein the channel identifier is used for identifying a target logical channel.

Optionally, the preferentially using the uplink grant resource to transmit data of a target logical channel in the first logical channels, includes: preferentially using the uplink grant resource to transmit data in the target logical channel identified by the channel identifier.

Optionally, the DCI includes a physical layer transmission parameter of the uplink grant resource, and the method further includes: acquiring the physical layer transmission parameter of the uplink grant resource according to the DCI; and determining whether the uplink grant resource is the target resource based on the physical layer transmission parameter of the uplink grant resource.

Optionally, the transmission profile corresponds to a physical layer transmission parameter set, a first mapping relationship is stored in the UE, the first mapping relationship is a mapping relationship between transmission profile identifiers and physical layer transmission parameter sets, configuration information of each logical channel in the UE includes a transmission profile identifier, and the determining whether the uplink grant resource is the target resource based on the physical layer transmission parameter of the uplink grant resource, includes: acquiring a transmission profile identifier corresponding to the uplink grant resource based on the physical layer transmission parameter of the uplink grant resource and the first mapping relationship; acquiring a logical channel corresponding to the uplink grant resource based on the transmission profile identifier corresponding to the uplink grant resource and the configuration information of each logical channel in the UE; determining whether the logical channel corresponding to the uplink grant resource includes a target logical channel; and when the logical channel corresponding to the uplink grant resource includes a target logical channel, determining the uplink grant resource to be the target resource.

Optionally, the preferentially using the uplink grant resource to transmit data of a target logical channel in the first logical channels, includes: preferentially using the uplink grant resource to transmit data in the target logical channel corresponding to the uplink grant resource.

Optionally, the method further includes: receiving the first mapping relationship and the configuration information of each logical channel in the UE sent by the base station through a radio resource control (RRC) signaling.

Optionally, the physical layer transmission parameter set includes at least one of a set of basic parameters, transmission time interval (TTI) lengths, and carrier frequencies.

Optionally, the transmission profile corresponds to a physical layer transmission parameter set, the DCI includes a physical layer transmission parameter of the uplink grant resource, a second mapping relationship is stored in the UE, the second mapping relationship is a mapping relationship between virtual transmission profile identifiers and target physical layer transmission parameter sets, the target physical layer transmission parameter sets correspond to transmission profiles of target resources, and the method further includes: determining the uplink grant resource as the target resource when virtual indication information corresponding to the uplink grant resource is included in the DCI; wherein the virtual indication information is used for instructing the UE to acquire a virtual transmission profile identifier corresponding to the uplink grant resource according to the physical layer transmission parameter of the uplink grant resource and the second mapping relationship.

Optionally, configuration information of each target logical channel in the UE includes a virtual transmission profile identifier, and the preferentially using the uplink grant resource to transmit data of a target logical channel in the first logical channels, includes: acquiring a virtual transmission profile identifier corresponding to the uplink grant resource based on the physical layer transmission parameter of the uplink grant resource and the second mapping relationship according to the virtual indication information; determining a target logical channel corresponding to the uplink grant resource according to the virtual transmission profile identifier corresponding to the uplink grant resource and the configuration information of each target logical channel in the UE; and preferentially using the uplink grant resource to transmit data in the target logical channel corresponding to the uplink grant resource.

Optionally, the method further includes: receiving the second mapping relationship and the configuration information of each target logical channel in the UE sent by the base station through a radio resource control (RRC) signaling.

Optionally, the base station configures a priority for each logical channel in the UE, and a priority configured by the base station for a target logical channel is the highest priority, and a quantity of the first logical channels is greater than or equal to one, the method further includes: acquiring a priority of each logical channel in the first logical channels; and when a logical channel configured with the highest priority exists in the first logical channels, determining the uplink grant resource as the target resource.

Optionally, the preferentially using the uplink grant resource to transmit data of a target logical channel in the first logical channels, includes: preferentially using the uplink grant resource to transmit data of the logical channel configured with the highest priority.

Optionally, the method further includes: receiving a priority of each logical channel in the UE sent by the base station through a radio resource control (RRC) signaling.

Optionally, the base station configures each logical channel in the UE with a priority and a priority bit rate (PBR), a priority configured by the base station for a target logical channel is the highest priority, a PBR configured by the base station for a target logical channel is infinite, and a quantity of the first logical channels is greater than or equal to one, the method further includes: acquiring the priority and the PBR of each logical channel in the first logical channels; and when a logical channel configured with the highest priority and infinite PBR exists in the first logical channels, determining the uplink grant resource as the target resource.

Optionally, the preferentially using the uplink grant resource to transmit data of a target logical channel in the first logical channels, includes: acquiring a Bucket Size Duration (BSD) of each logical channel in the first logical channels; and according to a priority, a PBR, and a BSD of each logical channel of the first logical channels, using the uplink grant resource to transmit data of the first logical channels.

Optionally, the method further includes: receiving the priority, the PBR, and the BSD of each logical channel in the UE sent by the base station through a radio resource control (RRC) signaling.

Optionally, when the first logical channels include one target logical channel, the preferentially using the uplink grant resource to transmit data of a target logical channel in the first logical channels includes: determining a size of the uplink grant resource; when the size of the uplink grant resource is less than a data amount of data in the target logical channel, acquiring target data from the data in the target logical channel and transmitting the target data using the uplink grant resource, wherein the data amount of the target data is equal to the size of the uplink grant resource; and when the size of the uplink grant resource is greater than or equal to the data amount of data in the target logical channel, transmitting all data in the target logical channel using the uplink grant resource.

Optionally, the method further includes: determining at least one remaining logical channel when the size of the uplink grant resource is greater than the data amount of data in the target logical channel, wherein the remaining logical channel is a logical channel other than the target logical channel in the first logical channels; acquiring a priority, a priority bit rate (PBR), and a Bucket Size Duration (BSD) of each remaining logical channel in the at least one remaining logical channel; and according to the priority, the PBR, and the BSD of each of the remaining logical channels, transmitting data of the remaining logical channels when transmitting all data in the target logical channel using the uplink grant resource.

Optionally, when the first logical channels include at least two target logical channels, the preferentially using the uplink grant resource to transmit data of a target logical channel in the first logical channels includes: acquiring a priority, a priority bit rate (PBR), and a Bucket Size Duration (BSD) of each target logical channel in the at least two target logical channels; and according to the priority, the PBR, and the BSD of the each target logical channel, transmitting data in the at least two target logical channels using the uplink grant resource until the data in the at least two target logical channels are all transmitted through the uplink grant resource, or until the uplink grant resource is all occupied by the data in the at least two target logical channels.

In a second aspect, a method for resource allocation is provided, the method including: sending downlink control information (DCI) to a User Equipment (UE), wherein the DCI is used for identifying an uplink grant resource allocated to the UE by a base station, the uplink grant resource corresponds to a transmission profile, the uplink grant resource is used for carrying data of first logical channels, and transmission profiles configured for the first logical channels include the transmission profile corresponding to the uplink grant resource; the DCI is used for instructing the UE to preferentially use the uplink grant resource to transmit data of a target logical channel in the first logical channels when the uplink grant resource is a target resource; wherein the target logical channel is a logical channel configured with only one transmission profile, and the target resource is an uplink grant resource with a corresponding transmission profile being the same as a transmission profile configured for the target logical channel.

Optionally, the DCI includes a channel identifier corresponding to the uplink grant resource, and the channel identifier is used for identifying a target logical channel.

Optionally, the DCI includes a physical layer transmission parameter of the uplink grant resource.

Optionally, the transmission profile corresponds to a physical layer transmission parameter set, and the physical layer transmission parameter set includes at least one of transmission time interval (TTI) lengths, a set of basic parameters, and carrier frequencies.

Optionally, the method further includes: sending a first mapping relationship and configuration information of each logical channel in the UE to the UE through a radio resource control (RRC) signaling, wherein the first mapping relationship is a mapping relationship between transmission profile identifiers and physical layer transmission parameter sets, and the configuration information of each logical channel in the UE includes a transmission profile identifier.

Optionally, the method further includes: sending a second mapping relationship and configuration information of each target logical channel in the UE to the UE through a radio resource control (RRC) signaling, wherein the second mapping relationship is a mapping relationship between virtual transmission profile identifiers and target physical layer transmission parameter sets, the target physical layer transmission parameter sets correspond to transmission profiles of target resources, and the configuration information of each target logical channel in the UE includes a virtual transmission profile identifier.

Optionally, the method further includes: sending a priority, a priority bit rate (PBR), and a Bucket Size Duration (BSD) of each logical channel in the UE to the UE through a radio resource control (RRC) signaling.

In a third aspect, a User Equipment (UE) is provided, the UE including: a receiving module, used for receiving downlink control information (DCI) sent by a base station, wherein the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource; and a transmitting module, used for preferentially using the uplink grant resource to transmit data of a target logical channel in the first logical channels when the uplink grant resource is a target resource; wherein the target logical channel is a logical channel configured with only one transmission profile, and the target resource is an uplink grant resource with a corresponding transmission profile being the same as a transmission profile configured for the target logical channel.

Optionally, the transmitting module is used for determining that the uplink grant resource is the target resource when a channel identifier corresponding to the uplink grant resource is included in the DCI; wherein the channel identifier is used for identifying a target logical channel.

Optionally, the transmitting module is used for: preferentially using the uplink grant resource to transmit data in the target logical channel identified by the channel identifier.

Optionally, the DCI includes a physical layer transmission parameter of the uplink grant resource, and the transmitting module is used for: acquiring the physical layer transmission parameter of the uplink grant resource according to the DCI; and determining whether the uplink grant resource is the target resource based on the physical layer transmission parameter of the uplink grant resource.

Optionally, the transmission profile corresponds to a physical layer transmission parameter set, a first mapping relationship is stored in the UE, the first mapping relationship is a mapping relationship between transmission profile identifiers and physical layer transmission parameter sets, configuration information of each logical channel in the UE includes a transmission profile identifier, and the transmitting module is used for: acquiring a transmission profile identifier corresponding to the uplink grant resource based on the physical layer transmission parameter of the uplink grant resource and the first mapping relationship; acquiring a logical channel corresponding to the uplink grant resource based on the transmission profile identifier corresponding to the uplink grant resource and the configuration information of each logical channel in the UE; determining whether the logical channel corresponding to the uplink grant resource includes a target logical channel; and when the logical channel corresponding to the uplink grant resource includes a target logical channel, determining the uplink grant resource to be the target resource.

Optionally, the transmitting module is used for: preferentially using the uplink grant resource to transmit data in the target logical channel corresponding to the uplink grant resource.

Optionally, the receiving module is further used for: receiving the first mapping relationship and the configuration information of each logical channel in the UE sent by the base station through a radio resource control (RRC) signaling.

Optionally, the physical layer transmission parameter set includes at least one of a set of basic parameters, transmission time interval (TTI) lengths, and carrier frequencies.

Optionally, the transmission profile corresponds to a physical layer transmission parameter set, the DCI includes a physical layer transmission parameter of the uplink grant resource, a second mapping relationship is stored in the UE, the second mapping relationship is a mapping relationship between virtual transmission profile identifiers and target physical layer transmission parameter sets, the target physical layer transmission parameter sets correspond to transmission profiles of target resources, and the transmitting module is used for: determining the uplink grant resource as the target resource when virtual indication information corresponding to the uplink grant resource is included in the DCI; wherein the virtual indication information is used for instructing the UE to acquire a virtual transmission profile identifier corresponding to the uplink grant resource according to the physical layer transmission parameter of the uplink grant resource and the second mapping relationship.

Optionally, configuration information of each target logical channel in the UE includes a virtual transmission profile identifier, and the transmitting module is used for: acquiring a virtual transmission profile identifier corresponding to the uplink grant resource based on the physical layer transmission parameter of the uplink grant resource and the second mapping relationship according to the virtual indication information; determining a target logical channel corresponding to the uplink grant resource according to the virtual transmission profile identifier corresponding to the uplink grant resource and the configuration information of each target logical channel in the UE; and preferentially using the uplink grant resource to transmit data in the target logical channel corresponding to the uplink grant resource.

Optionally, the receiving module is further used for: receiving the second mapping relationship and the configuration information of each target logical channel in the UE sent by the base station through a radio resource control (RRC) signaling.

Optionally, the base station configures a priority for each logical channel in the UE, a priority configured by the base station for a target logical channel is the highest priority, a quantity of the first logical channels is greater than or equal to one, and the transmitting module is used for: acquiring a priority of each logical channel in the first logical channels; and when a logical channel configured with the highest priority exists in the first logical channels, determining the uplink grant resource as the target resource.

Optionally, the transmitting module is used for: preferentially using the uplink grant resource to transmit data of the logical channel configured with the highest priority.

Optionally, the receiving module is further used for: receiving a priority of each logical channel in the UE sent by the base station through a radio resource control (RRC) signaling.

Optionally, the base station configures each logical channel in the UE with a priority and a priority bit rate (PBR), a priority configured by the base station for a target logical channel is the highest priority, a PBR configured by the base station for a target logical channel is infinite, and a quantity of the first logical channels is greater than or equal to one, the transmitting module is used for: acquiring the priority and the PBR of each logical channel in the first logical channels; and when a logical channel configured with the highest priority and infinite PBR exists in the first logical channels, determining the uplink grant resource as the target resource.

Optionally, the transmitting module is used for: acquiring a Bucket Size Duration (BSD) of each logical channel in the first logical channels; and according to a priority, a PBR, and a BSD of each logical channel of the first logical channels, using the uplink grant resource to transmit data of the first logical channels.

Optionally, the receiving module is further used for: receiving the priority, the PBR, and the BSD of each logical channel in the UE sent by the base station through a radio resource control (RRC) signaling.

Optionally, when the first logical channels include one target logical channel, the transmitting module is used for: determining a size of the uplink grant resource; when the size of the uplink grant resource is less than a data amount of data in the target logical channel, acquiring target data from the data in the target logical channel and transmitting the target data using the uplink grant resource, wherein the data amount of the target data is equal to the size of the uplink grant resource; and when the size of the uplink grant resource is greater than or equal to the data amount of data in the target logical channel, transmitting all data in the target logical channel using the uplink grant resource.

Optionally, the transmitting module is used for: determining at least one remaining logical channel when the size of the uplink grant resource is greater than the data amount of data in the target logical channel, wherein the remaining logical channel is a logical channel other than the target logical channel in the first logical channels; acquiring a priority, a priority bit rate (PBR), and a Bucket Size Duration (BSD) of each remaining logical channel in the at least one remaining logical channel; and according to the priority, the PBR, and the BSD of each of the remaining logical channels, transmitting data of the remaining logical channels when transmitting all data in the target logical channel using the uplink grant resource.

Optionally, when the first logical channels include at least two target logical channels, the transmitting module is used for: acquiring a priority, a priority bit rate (PBR), and a Bucket Size Duration (BSD) of each target logical channel in the at least two target logical channels; and according to the priority, the PBR, and the BSD of the each target logical channel, transmitting data in the at least two target logical channels using the uplink grant resource until the data in the at least two target logical channels are all transmitted through the uplink grant resource, or until the uplink grant resource is all occupied by the data in the at least two target logical channels.

In a fourth aspect, a base station is provided, the base station including: a sending module, used for sending downlink control information (DCI) to a User Equipment (UE), wherein the DCI is used for identifying an uplink grant resource allocated to the UE by a base station, the uplink grant resource corresponds to a transmission profile, the uplink grant resource is used for carrying data of first logical channels, and transmission profiles configured for the first logical channels include the transmission profile corresponding to the uplink grant resource; the DCI is used for instructing the UE to preferentially use the uplink grant resource to transmit data of a target logical channel in the first logical channels when the uplink grant resource is a target resource; wherein the target logical channel is a logical channel configured with only type of one transmission profile, and the target resource is an uplink grant resource with a corresponding transmission profile being the same as a transmission profile configured for the target logical channel.

Optionally, the DCI includes a channel identifier corresponding to the uplink grant resource, and the channel identifier is used for identifying a target logical channel.

Optionally, the DCI includes a physical layer transmission parameter of the uplink grant resource.

Optionally, the transmission profile corresponds to a physical layer transmission parameter set, and the physical layer transmission parameter set includes at least one of transmission time interval (TTI) lengths, a set of basic parameters, and carrier frequencies.

Optionally, the sending module is further used for: sending a first mapping relationship and configuration information of each logical channel in the UE to the UE through a radio resource control (RRC) signaling, wherein the first mapping relationship is a mapping relationship between transmission profile identifiers and physical layer transmission parameter sets, and the configuration information of each logical channel in the UE includes a transmission profile identifier.

Optionally, the sending module is further used for: sending a second mapping relationship and configuration information of each target logical channel in the UE to the UE through a radio resource control (RRC) signaling, wherein the second mapping relationship is a mapping relationship between virtual transmission profile identifiers and target physical layer transmission parameter sets, the target physical layer transmission parameter sets correspond to transmission profiles of target resources, and the configuration information of each target logical channel in the UE includes a virtual transmission profile identifier.

Optionally, the sending module is further used for: sending a priority, a priority bit rate (PBR), and a Bucket Size Duration (BSD) of each logical channel in the UE to the UE through a radio resource control (RRC) signaling.

In a fifth aspect, a system for resource allocation is provided, and the system for resource allocation includes the UE according to any one implementation of the third aspect and the base station according to any one implementation of the fourth aspect.

In a sixth aspect, a computer readable storage medium is provided, and the computer readable storage medium stores a computer program, and when the computer program is executed by a processor, the processor can implement the method for resource allocation according to any one implementation of the first aspect; or, when the computer program is executed by a processor, the processor can implement the method for resource allocation according to any one implementation of the second aspect.

BRIEF DESCRIPTION OF DRAWINGS

In order to explain the technical solutions of the implementations of the present disclosure more clearly, drawings referred to in the description of the implementations or the related art will be briefly introduced below. Obviously, the drawings in the following description are only some implementations of the present disclosure. For those of ordinary skill in the art, other drawings may be obtained according to those drawings without paying an inventive effort.

FIG. 1 is a schematic diagram of an implementation environment involved in a method for resource allocation according to an implementation of the present disclosure.

FIG. 2 is a flowchart of a method for resource allocation according to an implementation of the present disclosure.

FIG. 3 is a flowchart of a method for resource allocation according to an implementation of the present disclosure.

DETAILED DESCRIPTION

Figure 4:
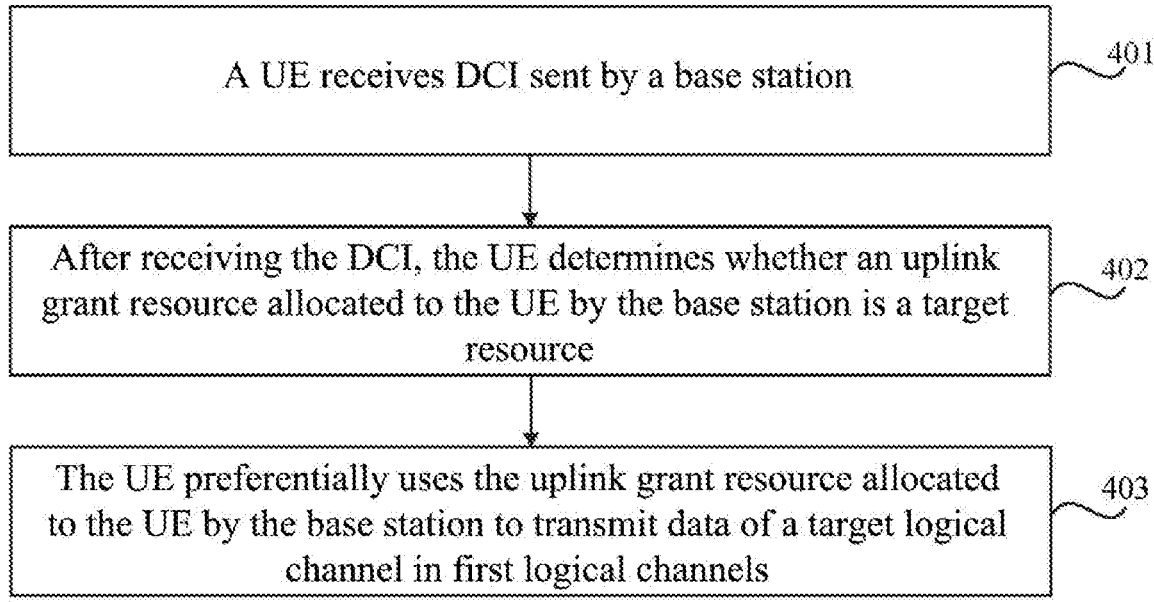
FIG. 4 is a flowchart of a method for resource allocation according to an implementation of the present disclosure.

In order to make objects, technical solutions and advantages of the present disclosure more clear, the implementations of the present disclosure will be described in further detail below with reference to the accompanying drawings.

In a practical application, a User Equipment (UE) may include multiple protocol sublayers, wherein the multiple protocol sublayers may include a Radio Link Control (RLC) layer and a Media Access Control (MAC) layer. A Service Access point (SAP) between the RLC layer and the MAC layer is a logical channel. The SAP refers to a logical interface between two adjacent protocol layers. In a process of sending uplink data by the UE, the MAC layer may map data of a logical channel to an uplink grant resource allocated by a base station to the UE, and send the data of the logical channel to the base station through the uplink grant resource.

In a practical application, a MAC layer may map data of multiple logical channels into a same uplink grant resource and send the data of the multiple logical channels to a base station through the same uplink grant resource. This process may be called as multiplexing of an uplink grant resource. In a process of multiplexing an uplink grant resource, a MAC layer may map data of multiple logical channels to a same uplink grant resource using a Bucket Size algorithm. The Bucket Size algorithm will be briefly explained in an implementation of the present disclosure below.

In the Bucket Size algorithm, configuration information (Logical Channel Config) of each logical channel may include a priority, a priority bit rate (PBR), and a Bucket Size Duration (BSD) of the each logical channel. In addition, a MAC layer may configure a variable Bj for each logical channel, and an initial value of Bj is 0. When a base station allocates one uplink grant resource to a UE and data of a logical channel is not mapped into the uplink grant resource, a Bj value corresponding to the logical channel may be added by PBR×TTI, wherein a Transmission Time Interval (TTI) refers to a transmission time interval. And, when the data of the logical channel is mapped into the uplink grant resource, a data amount of the data of the logical channel mapped into the uplink grant resource may be subtracted from the Bj value corresponding to the logical channel. In the Bucket Size algorithm, the Bj value will not increase when it is increased to be PBR×BSD.

In a process of mapping data of multiple logical channels to a same uplink grant resource, a MAC layer may determine all logical channels with Bj>0 in the multiple logical channels, and sequentially map data with a data amount PBR×TTI in each logical channel with B>0 into the uplink grant resource in order of a priority from high to low.

For example, if a MAC layer determines that Bj values corresponding to a logical channel i, a logical channel j and a logical channel k are all greater than 0, and a priority of the logical channel i is a higher priority and a PBR of the logical channel i is a, a priority of the logical channel j is a medium priority and a PBR of the logical channel j is b, a priority of the logical channel k is a lower priority and a PBR of the logical channel k is c, then the MAC layer may map data with a data amount a×TTI of the logical channel i into an uplink grant resource first, and then map data with a data amount b×TTI of the logical channel j into the uplink grant resource, and then map data with a data amount c×TTI of the logical channel k into the uplink grant resource.

It should be pointed out that if a PBR of a logical channel is infinite, in a mapping process, a MAC layer needs to map all data of the logical channel into an uplink grant resource before the MAC layer maps data of another logical channel with a lower priority than that of the logical channel into the uplink grant resource.

In a mapping process, when an uplink grant resource is completely occupied after data with a data amount PBR×TTI in a logical channel is mapped into the uplink grant resource, then data of a logical channel with a lower priority than that of the logical channel cannot be mapped into the uplink grant resource.

For example, in the above example, after a MAC layer maps the data with a data amount b×TTI of the logical channel j into an uplink grant resource, the uplink grant resource is completely occupied, and at this time, the data of the logical channel k cannot be mapped into the uplink grant resource.

In addition, in a mapping process, when data with a data amount PBR×TTI of a logical channel with the lowest priority is mapped into an uplink grant resource, the uplink grant resource is not fully occupied yet, and a MAC layer may continue mapping data of a logical channel with the highest priority into the uplink grant resource (regardless of whether a Bj value corresponding to the logical channel with the highest priority is greater than 0) until the data of the logical channel with the highest priority are all mapped into the uplink grant resource, or until the uplink grant resource is fully occupied.

For example, in the above example, after a MAC layer maps the data with a data amount c×TTI of the logical channel k into an uplink grant resource, the uplink grant resource is not fully occupied yet, then the MAC layer may continue mapping the data of the logical channel i into the uplink grant resource (regardless of whether a Bj value corresponding to the logical channel i is greater than 0) until the data of the logical channel i are fully mapped into the uplink grant resource, or until the uplink grant resource is fully occupied.

When all data in a logic channel with the highest priority is mapped into an uplink grant resource, the uplink grant resource is not fully occupied yet, a MAC layer may continue mapping data of a logic channel with the second highest priority into the uplink grant resource in the same way as the above description, and so on until the uplink grant resource is fully occupied.

In a current communication system, physical layer transmission parameters of different uplink grant resources are the same, therefore, a logical channel has no selectivity to an uplink grant resource, that is, data of a logical channel may be carried through any uplink grant resource. However, in a Fifth Generation Mobile Communication Technology (5G) communication system, physical layer transmission parameters of different uplink grant resources are likely to be different, which leads to a selectivity of a logical channel to an uplink grant resource, that is, data in different logical channels in the 5G communication system need to be carried through different types of uplink grant resources.

In a 5G communication system, data in some logical channels (referred to herein as a logical channel A) may be carried through multiple types of uplink grant resources, while data in other logical channels (referred to herein as a logical channel B) can be carried through only one type of uplink grant resource. In this case, if one type of uplink grant resource can carry both the data of the logical channel A and the data of the logical channel B, the data of the logical channel A and the data of the logical channel B being mapped into the one type of uplink grant resource according to a Bucket Size algorithm will cause the logical channel B to be unable to occupy sufficient uplink grant resource, thus affecting data transmission of the logical channel B, resulting in lower Quality of Service (QoS) of services corresponding to the data of the logical channel B. In order to solve the problem, an implementation of the present disclosure provides a method for resource allocation.

FIG. 1 is a schematic diagram of an implementation environment related to a method for resource allocation according to an implementation of the present disclosure. As shown in FIG. 1, the implementation environment may include a base station 10 and a User Equipment (UE) 20. In a 5G communication system, the base station 10 may be a generation NodeB (gNB), the UE 20 may be a smart phone, a computer, a multimedia player, an electronic reader, a wearable device, etc., and the base station 10 and the UE 20 may communicate through a wireless communication network.

FIG. 2 is a flowchart of a method for resource allocation according to an implementation of the present disclosure. The method for resource allocation is applied to the UE 20 shown in FIG. 1. As shown in FIG. 2, the method for resource allocation includes the following acts.

Act 201: a User Equipment (UE) receives downlink control information (DCI) sent by a base station, the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource.

Act 202: when the uplink grant resource is a target resource, the UE preferentially uses the uplink grant resource to transmit data of a target logical channel in the first logical channels.

The target logical channel is a logical channel configured with only one transmission profile, and the target resource is an uplink grant resource with a corresponding transmission profile being the same as a transmission profile configured for the target logical channel.

In summary, through the method for resource allocation according to the implementation of the present disclosure, when an uplink grant resource allocated by a base station to a User Equipment (UE) is a target resource, the uplink grant resource is preferentially used for transmitting data of a target logical channel, the target logical channel is a logical channel configured with only one transmission profile, and the target resource is an uplink grant resource with the same transmission profile as that configured for the target logical channel, so that data in the logical channel which is configured with only one transmission profile and can be carried by only one type of uplink grant resource, may be preferentially transmitted, thereby ensuring Quality of Service (QoS) of services corresponding to the logical channel which can be carried by only one type of uplink grant resource.

FIG. 3 is a flowchart of a method for resource allocation according to an implementation of the present disclosure. The method for resource allocation is applied to the base station 10 as shown in FIG. 1. As shown in FIG. 3, the method for resource allocation includes the following acts.

Act 301: a base station sends downlink control information (DCI) to a User Equipment (UE), wherein the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource.

The DCI is used for instructing the UE to preferentially use the uplink grant resource to transmit data of a target logical channel in the first logical channels when the uplink grant resource is a target resource. The target logical channel is a logical channel configured with only one transmission profile, and the target resource is an uplink grant resource with a corresponding transmission profile being the same as a transmission profile configured for the target logical channel.

In summary, through the method for resource allocation according to the implementation of the present disclosure, a base station sends DCI to a UE, and when an uplink grant resource allocated by a base station to a User Equipment (UE) is a target resource, the DCI instructs the UE to preferentially use the uplink grant resource to transmit data of a target logical channel, the target logical channel is a logical channel configured with only one transmission profile, and the target resource is an uplink grant resource with the same transmission profile as that configured for the target logical channel, so that data in the logical channel which is configured with only one transmission profile and can be carried by only one type of uplink grant resource, may be preferentially transmitted, thereby ensuring Quality of Service (QoS) of services corresponding to the logical channel which can be carried by only one type of uplink grant resource.

FIG. 4 is a flowchart of a method for resource allocation according to an implementation of the present disclosure.

The method for resource allocation is applied to the implementation environment as shown in FIG. 1. As shown in FIG. 4, the method for resource allocation includes the following acts.

Act 401: a User Equipment (UE) receives downlink control information (DCI) sent by a base station.

In a practical application, the UE may send an uplink scheduling request to the base station before sending uplink data, and the base station may send the DCI to the UE for allocating an uplink grant resource for the UE after receiving the uplink scheduling request. The DCI sent by the base station to the UE may be used for identifying the uplink grant resource allocated to the UE by the base station, for example, the DCI may include a time domain position and a frequency domain position of the uplink grant resource allocated to the UE by the base station.

It should be pointed out that in a practical application, a base station may allocate one uplink grant resource or at least two uplink grant resources to a UE, and correspondingly, DCI may identify the one uplink grant resource or at least two uplink grant resources. The implementation of the present disclosure will be described with an example of allocating one uplink grant resource to the UE by the base station. The case of allocating at least two uplink grant resources to the UE by the base station is the same as the case of allocating one uplink grant resource to the UE by the base station, and the implementation of the present disclosure will not be described here.

Since physical layer transmission parameters of different uplink grant resources in a 5G communication system are different, in order to characterize different uplink grant resources, a concept of transmission profile (TP) is introduced into the 5G communication system, a TP may correspond to a physical layer transmission parameter set, which may include at least one of a set of basic parameters, TTI lengths, and carrier frequencies, and the set of basic parameters may include subcarrier intervals. As shown in Table 1 is an example mapping relationship between TPs and physical layer transmission parameter sets.

TABLE 1

| TP identifier | Physical layer transmission parameter set | | |
| --- | --- | --- | --- |
| | Subcarrier interval | TTI length | Carrier frequency |
| u | 15 KHz | 1 ms | Freq_1 |
| v | 30 KHz | 0.5 ms | Freq_2 |
| w | 60 KHz | 0.25 ms | Freq_3 |

In a 5G communication system, each uplink grant resource may correspond to one TP, and a physical layer transmission parameter of an uplink grant resource is the same as a physical layer transmission parameter included in a physical layer transmission parameter set corresponding to a TP corresponding to the uplink grant resource. For example, as shown in Table 1, if a subcarrier interval of an uplink grant resource is 15 KHz, a TTI length is 1 ms, and a carrier frequency is Freq_1, then a TP corresponding to the uplink grant resource is TP u.

In addition, in a 5G communication system, each logical channel may be configured with at least one TP, and data of the logical channel may be carried through an uplink grant resource corresponding to a TP which the logical channel is configured with. For example, a logical channel i may be configured with TP u and TP v, a TP corresponding to an uplink grant resource R is TP u, and a TP corresponding to an uplink grant resource T is TP v, then data of the logical channel i may be carried through the uplink grant resource R and the uplink grant resource T.

From the above description, it may be seen that an uplink grant resource allocated by a base station to a UE may carry data of a logical channel configured with a TP which includes a TP corresponding to the uplink grant resource. In order to simplify the description, first logical channels will be hereinafter referred to as the "logical channel configured with a TP which includes a TP corresponding to the uplink grant resource".

Act 402: after receiving the DCI, the UE determines whether the uplink grant resource allocated to the UE by the base station is a target resource.

The target resource is an uplink grant resource of which a TP is the same as a TP which a target logical channel is configured with, and the target logical channel is a logical channel configured with only one TP. For example, only one TP is configured for a logical channel j, the TP is TP u and a TP corresponding to an uplink grant resource R is also TP u, then the logical channel j is a target logical channel and the uplink grant resource R is a target resource.

As mentioned above, in a 5G communication system, each logical channel may be configured with at least one TP, and data of a logical channel may be carried through an uplink grant resource corresponding to a TP which the logical channel is configured with, then data of a logical channel (i.e., a target logical channel) configured with only one TP can be carried through only one uplink grant resource, which is a target resource.

As mentioned above, when the target resource can carry data of another logical channel in addition to a target logical channel, and TPs which the another logical channel is configured with are at least two TPs (indicating that data of the another logical channel may be carried through a variety of uplink grant resources), occupation for a target resource by the data of the another logical channel is likely to result in the target logical channel not occupying enough uplink grant resources, thus causing poor QoS of services corresponding to the target logical channel. Therefore, in order to ensure the QoS of the services corresponding to the target logical channel, the implementation of the present disclosure may enable the target resource to preferentially carry the data of the target logical channel.

In order to achieve this goal, a UE needs to perform the act 402, that is, the UE needs to determine whether an uplink grant resource allocated by a base station to itself is a target resource. When the UE determines that the uplink grant resource allocated by the base station to itself is a target resource, the UE may perform the act 403 to preferentially transmit data of a target logical channel in first logical channels by using the uplink grant resource allocated by the base station to itself. When the UE determines that the uplink grant resource allocated by the base station to itself is not a target resource, the UE may map data of the first logical channels into the uplink grant resource allocated to the UE by the base station according to the Bucket Size algorithm described above, and transmit the data of the first logical channels using the uplink grant resource.

The implementation of the present disclosure provides five methods for determining whether an uplink grant resource allocated to a UE by a base station is a target resource.

In a first method, a UE detects whether DCI includes a channel identifier corresponding to an uplink grant resource allocated to the UE by a base station, wherein the channel identifier is used for identifying a target logical channel.

In the first method, when the base station determines that the uplink grant resource allocated to the UE by itself is the target resource, the base station may add a channel identifier corresponding to the uplink grant resource into the DCI, therefore, the UE may determine that the uplink grant resource is the target resource after detecting that the DCI includes the channel identifier, and the UE may determine that a logical channel corresponding to the channel identifier included in the DCI is the target logical channel in the first logical channels.

In a second method, a UE determines whether an uplink grant resource is a target resource based on a physical layer transmission parameter of an uplink grant resource allocated by a base station.

In the second method, the UE may receive in advance a first mapping relationship and configuration information (Logical Channel Config) of each logical channel sent by the base station through a Radio Resource Control (RRC) signaling, wherein the first mapping relationship is a mapping relationship between TP identifiers and physical layer transmission parameter sets. The first mapping relationship may be the mapping relationship shown in Table 1. The configuration information of the logical channel includes a TP identifier configured by the base station for the logical channel. Meanwhile, the DCI sent by the base station may include a physical layer transmission parameter of the uplink grant resource allocated to the UE by the base station.

In the implementation of the present disclosure, the second determining method may include the following acts.

Act a1: after receiving the DCI, the UE obtains a physical layer transmission parameter of the uplink grant resource allocated to the UE by the base station from the DCI.

Act a2: the UE obtains a TP identifier corresponding to the uplink grant resource based on the physical layer transmission parameter of the uplink grant resource allocated to the UE by the base station and a first mapping relationship received in advance.

For example, after receiving the DCI, the physical layer transmission parameter of the uplink grant resource obtained by the UE from the DCI includes: a subcarrier interval is 15 KHz, a TTI length is 1 ms, and a carrier frequency is Freq_1. By looking up Table 1, the UE may determine that the TP identifier corresponding to the uplink grant resource allocated to the UE by the base station is TP u.

Act a3: the UE obtains a logical channel corresponding to the uplink grant resource allocated to the UE by the base station based on the TP identifier corresponding to the uplink grant resource and configuration information of each logical channel received in advance.

In a practical application, the UE may search for the configuration information of each logical channel based on the TP identifier corresponding to the uplink grant resource, thereby determining a logical channel of which configuration information includes a TP identifier corresponding to the uplink grant resource. The UE may determine the logical channel of which configuration information includes the TP identifier corresponding to the uplink grant resource as a logical channel corresponding to the uplink grant resource allocated to the UE by the base station.

Act a4: the UE determines whether the logical channel corresponding to the uplink grant resource allocated to the UE by the base station includes a target logical channel.

In a practical application, the UE may determine a logical channel configured with only one TP identifier based on the configuration information of each logical channel received in advance, the UE may determine the logical channel configured with only one TP identifier as a target logical channel included in the UE, and then the UE may determine whether there is an intersection between the logical channel corresponding to the uplink grant resource allocated to the UE by the base station and the target logical channel included in the UE, and if there is an intersection, the UE may determine that the logical channel corresponding to the uplink grant resource allocated to the UE by the base station includes the target logical channel.

Act a5: when the logical channel corresponding to the uplink grant resource allocated to the UE by the base station includes the target logical channel, the UE determines that the uplink grant resource allocated to the UE by the base station is the target resource, and the UE determines that the target logical channel included in the logical channel corresponding to the uplink grant resource is a target logical channel in the first logical channels.

In a third method, a UE detects whether DCI includes virtual indication information corresponding to an uplink grant resource allocated to the UE by a base station.

In the third method, the UE may receive in advance a second mapping relationship sent by the base station through an RRC signaling, which is a mapping relationship between virtual TP identifiers and target physical layer transmission parameter sets, wherein the sets of target physical layer transmission parameter correspond to TPs of target resources, and Table 2 shows an example second mapping relationship.

TABLE 2

| Virtual TP identifier | Target physical layer transmission parameter set | | |
|---|---|---|---|
| | Subcarrier interval | TTI length | carrier frequency |
| u1 | 15 KHz | 1 ms | Freq_1 |
| v1 | 30 KHz | 0.5 ms | Freq_2 |
| w1 | 60 KHz | 0.25 ms | Freq_3 |

A subcarrier interval of 15 KHz, a TTI length of 1 ms, and a carrier frequency of Freq_1 correspond to a TP of a target resource m1, a subcarrier interval of 30 KHz, a TTI length of 0.5 ms, and a carrier frequency of Freq_2 correspond to a TP of a target resource m2, and a subcarrier interval of 60 KHz, a TTI length of 0.25 ms, and a carrier frequency of Freq_3 correspond to a TP of a target resource m3.

In addition, a UE may receive configuration information of a target logical channel sent by a base station through an RRC signaling in advance, the configuration information of the target logical channel includes a virtual TP identifier configured by the base station for the target logical channel, and DCI sent by the base station may include a physical layer transmission parameter of an uplink grant resource allocated to the UE by the base station.

In the implementation of the present disclosure, the third determining method may include the following acts.

Act b1: after receiving DCI, a UE obtains a physical layer transmission parameter of an uplink grant resource allocated to the UE by the base station from the DCI.

Act b2: the UE detects whether the DCI includes virtual indication information corresponding to the uplink grant resource allocated to the UE by the base station.

The virtual indication information is used for instructing the UE to obtain a virtual TP identifier corresponding to the uplink grant resource allocated to the UE by the base station according to the physical layer transmission parameter of the uplink grant resource allocated to the UE by the base station and a second mapping relationship received in advance.

Act b3: when detecting that the DCI includes the virtual indication information, the UE determines that the uplink grant resource allocated to the UE by the base station is a target resource.

Since a target physical layer transmission parameter set in the second mapping relationship is a physical layer transmission parameter set corresponding to a TP of the target resource, when the virtual indication information exists in the DCI, it may be explained that the uplink grant resource allocated to the UE by the base station is the target resource.

Act b4: according to the virtual indication information, the UE obtains a virtual TP identifier corresponding to the uplink grant resource allocated to the UE by the base station based on the physical layer transmission parameter of the uplink grant resource allocated to the UE by the base station in the DCI and a second mapping relationship received in advance.

For example, after receiving the DCI, physical layer transmission parameters of the uplink grant resource acquired by the UE from the DCI include: a subcarrier interval is 15 KHz, a TTI length is 1 ms, a carrier frequency is Freq_1, and when the UE detects virtual indication information from the DCI, the UE may determine a virtual TP identifier corresponding to the uplink grant resource allocated to the UE by the base station as TP u1 under indication of the virtual indication information through lookup Table 2.

Act b5: the UE determines a target logical channel corresponding to the uplink grant resource allocated to the UE by the base station according to the virtual TP identifier corresponding to the uplink grant resource and the configuration information of each target logical channel.

In a practical application, the UE may search for the configuration information of each target logical channel based on the virtual TP identifier corresponding to the uplink grant resource, thereby determining a target logical channel of which configuration information includes a TP identifier corresponding to the uplink grant resource. The UE may determine the target logical channel of which configuration information includes the TP identifier corresponding to the uplink grant resource as a target logical channel corresponding to the uplink grant resource allocated to the UE by the base station, and then the UE may determine the target logical channel corresponding to the uplink grant resource allocated to the UE by the base station as a target logical channel in the first logical channels.

In a fourth method, a UE determines whether there is a logical channel with the highest configured priority in first logical channels.

In the fourth method, a base station may configure a priority for each logical channel in the UE through an RRC signaling, and a priority configured by the base station for a target logical channel is the highest priority.

In the implementation of the present disclosure, the fourth determining method may include the following acts.

Act c1: a UE determines first logical channels.

In a practical application, the UE may determine the first logical channels in a variety of ways. Below, the implementation of the present disclosure will provide two example determination ways.

In a first way, DCI may include identifiers of first logical channels, and the UE may determine a first logical channel according to an identifier of the first logical channel in the DCI.

In a second way, the UE may receive the first mapping relationship and the configuration information of each logical channel in advance, and the DCI includes a physical layer transmission parameter of an uplink grant resource allocated to the UE by a base station, then the UE may obtain a physical layer transmission parameter of the uplink grant resource allocated to the UE by the base station after receiving the DCI, and the UE may obtain a TP corresponding to the uplink grant resource allocated to the UE by the base station according to the physical layer transmission parameter and the first mapping relationship. Then, the UE may search for the configuration information of each logical channel based on the TP corresponding to the uplink grant resource allocated to the UE by the base station, thereby determining a logical channel of which configuration information includes a TP identifier corresponding to the uplink grant resource, and the UE may determine the logical channel of which configuration information includes the TP identifier corresponding to the uplink grant resource as a first logical channel.

Act c2: the UE obtains a priority of each logical channel in the first logical channels.

Act c3: when a logical channel configured with the highest priority exists in the first logical channels, the UE determines an uplink grant resource allocated to the UE by a base station as a target resource.

Since a priority configured by a base station for a target logical channel is the highest priority, when there is a logical channel configured with the highest priority in the first logical channels, a UE may determine an uplink grant resource allocated to the UE by the base station as a target resource.

Act c4: the UE determines a logical channel configured with the highest priority as a target logical channel in the first logical channels.

In a fifth method, a UE determines whether there is a logical channel configured with the highest priority and infinite PBR in first logical channels.

In the fifth method, a base station may configure a priority and a PBR for each logical channel through an RRC signaling, and a priority configured by the base station for a target logical channel is the highest priority, and a configured PBR is infinite.

In the implementation of the present disclosure, the fifth determining method may include the following acts.

Act d1: a UE determines first logical channels.

A technical process of act d1 is the same as the technical process of act c1, and the implementation of the present disclosure will not be described here.

Act d2: the UE obtains a priority and a PBR of each logical channel in the first logical channels.

Act d3: when there is a logical channel configured with the highest priority and infinite PBR in the first logical channels, the UE determines that an uplink grant resource allocated to the UE by a base station is a target resource.

Since a priority configured by a base station for a target logical channel is the highest priority and a configured PBR is infinite, when there is a logical channel configured with the highest priority and infinite PBR in the first logical channels, a UE may determine an uplink grant resource allocated to the UE by the base station as a target resource.

Act 403: the UE preferentially uses the uplink grant resource allocated to the UE by the base station to transmit data of a target logical channel in first logical channels.

In the first four determining methods of act 402, a UE may obtain a target logical channel in first logical channels after determining that an uplink grant resource allocated to the UE by a base station is a target resource. In act 403, a UE may preferentially use an uplink grant resource allocated to itself by a base station to transmit data of a target logical channel in first logical channels. The implementation of the present disclosure provides two ways for a UE to preferentially transmit data of a target logical channel in first logical channels by using an uplink grant resource allocated by a base station to the UE according to different numbers of target logical channels included in the first logical channels.

First, when first logical channels include a target logical channel, a UE may preferentially use an uplink grant resource allocated to the UE by a base station to transmit data in the target logical channel in the first logical channels by the following acts.

Act e1: a UE determines a size of an uplink grant resource allocated to the UE by a base station.

In a practical application, a UE may determine a size of an uplink grant resource according to a time domain position and a frequency domain position of the uplink grant resource included in DCI.

Act e2: when the size of the uplink grant resource allocated to the UE by the base station is less than a data amount of data in a target logical channel, the UE obtains target data from the data of the target logical channel and transmits the target data using the uplink grant resource allocated to the UE by the base station, the data amount of the target data is equal to the size of the uplink grant resource.

Act e3: when the size of the uplink grant resource allocated to the UE by the base station is equal to a data amount of data in a target logical channel, the UE transmits all data in the target logical channel using the uplink grant resource allocated to the UE by the base station.

Act e4: when the size of the uplink grant resource allocated to the UE by the base station is greater than a data amount of data in a target logical channel, the UE maps all data in the target logical channel to the uplink grant resource allocated to the UE by the base station, and performs the following acts e5 to e8.

Act e5: the UE determines at least one remaining logical channel, which is a logical channel other than the target logical channel in the first logical channels.

Act e6: the UE obtains a priority, a PBR, and a BSD of each of the at least one remaining logical channel.

In a practical application, a priority, a PBR, and a BSD of each logical channel in a UE may be configured by a base station through an RRC signaling.

Act e7: according to the priority, the PBR, and the BSD of each remaining logical channel, the UE uses a Bucket Size algorithm to map data of the remaining logical channel to a resource not occupied by the data of the target logical channel in the uplink grant resource allocated to the UE by the base station.

Act e8: the UE transmits all data of the target logical channel and data mapped to the remaining logical channel in the uplink grant resource using the uplink grant resource allocated to the UE by the base station.

Second, when first logical channels include at least two target logical channels, a UE may preferentially use an uplink grant resource allocated by a base station to itself to transmit data in the target logical channel by the following acts.

Act f1: a UE obtains a priority, a PBR, and a BSD of each of at least two target logical channels.

Act f2: the UE transmits data in the at least two target logical channels using an uplink grant resource allocated to the UE by a base station according to the priority, the PBR, and the BSD of each target logical channel until all data in the at least two target logical channels are transmitted through the uplink grant resource, or until the uplink grant resource is all occupied by data in the at least two target logical channels.

In act f2, when transmitting the data of the at least two target logical channels, the UE may map the data of the at least two target logical channels into the uplink grant resource allocated to the UE by the base station using a Bucket Size algorithm, which is not described in the implementation of the present disclosure.

In the fifth determining method of act 402, a UE may determine whether an uplink grant resource allocated to the UE by a base station is a target resource according to whether there is a logical channel configured with the highest priority and infinite PBR in first logical channels.

When using the uplink grant resource to transmit data, a UE may obtain a priority, a PBR, and a BSD of each logical channel in first logical channels, and map data of first logical channels to an uplink grant resource allocated to the UE by a base station using a Bucket Size algorithm. Since a priority configured by a base station for a target logical channel is the highest priority and a configured PBR is infinite, in a process of mapping data of first logical channels to an uplink grant resource using a Bucket Size algorithm, a UE needs to map all data of a target logical channel in the first logical channels to the uplink grant resource before mapping data of another logical channel in the first logical channels to the uplink grant resource allocated to the UE by the base station. In this way, when an uplink grant resource allocated to a UE by a base station is a target resource, the uplink grant resource may be used for preferentially transmitting data of a target logical channel.

In summary, through the method for resource allocation according to the implementation of the present disclosure, when an uplink grant resource allocated by a base station to a User Equipment (UE) is a target resource, the uplink grant resource is preferentially used for transmitting data of a target logical channel, the target logical channel is a logical channel configured with only one transmission profile, and the target resource is an uplink grant resource with the same transmission profile as that configured for the target logical channel, so that data in the logical channel which is configured with only one transmission profile and can be carried by only one type of uplink grant resource, may be preferentially transmitted, thereby ensuring Quality of Service (QoS) of services corresponding to the logical channel which can be carried by only one type of uplink grant resource.

Figure 5:
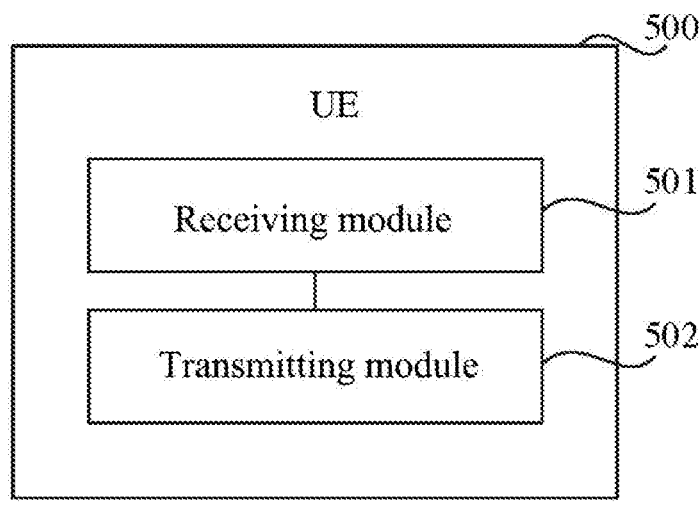
FIG. 5 is a block diagram of a User Equipment (UE) according to an implementation of the present disclosure.

FIG. 5 is a block diagram of a UE 50 according to an implementation of the present disclosure. As shown in FIG. 5, the UE 50 includes a receiving module 501 and a transmitting module 502.

The receiving module 501 is used for receiving downlink control information (DCI) sent by a base station, the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource.

The transmitting module 502 is used for preferentially using the uplink grant resource to transmit data of a target logical channel in the first logical channels when the uplink grant resource is a target resource.

The target logical channel is a logical channel configured with only one transmission profile, and the target resource is an uplink grant resource with a corresponding transmission profile being the same as a transmission profile configured for the target logical channel.

In one implementation of the present disclosure, the transmitting module 502 is used for determining the uplink grant resource as the target resource when the DCI includes a channel identifier corresponding to the uplink grant resource, wherein the channel identifier is used for identifying a target logical channel and is used for preferentially using the uplink grant resource to transmit data in the target logical channel identified by the channel identifier.

In one implementation of the present disclosure, the DCI includes a physical layer transmission parameter of the uplink grant resource, and the transmitting module 502 is used for acquiring the physical layer transmission parameter of the uplink grant resource according to the DCI and determining whether the uplink grant resource is a target resource based on the physical layer transmission parameter of the uplink grant resource.

In one implementation of the present disclosure, the transmission profile corresponds to a physical layer transmission parameter set, which includes at least one of a set of basic parameters, transmission time interval (TTI) lengths, and carrier frequencies. The UE stores a first mapping relationship, which is a mapping relationship between transmission profile identifiers and physical layer transmission parameter sets. Configuration information of each logical channel in the UE includes a transmission profile identifier. In this case, when determining whether the uplink grant resource is the target resource based on the physical layer transmission parameter of the uplink grant resource, the transmitting module 502 is used for: acquiring a transmission profile identifier corresponding to the uplink grant resource based on the physical layer transmission parameter of the uplink grant resource and the first mapping relationship; acquiring a logical channel corresponding to the uplink grant resource based on the transmission profile identifier corresponding to the uplink grant resource and the configuration information of each logical channel in the UE; determining whether the logical channel corresponding to the uplink grant resource includes a target logical channel; and when the logical channel corresponding to the uplink grant resource includes a target logical channel, determining the uplink grant resource to be the target resource; preferentially using the uplink grant resource to transmit data in the target logical channel corresponding to the uplink grant resource.

The receiving module 501 is further used for receiving the first mapping relationship sent by the base station through a radio resource control (RRC) signaling and the configuration information of each logical channel in the UE.

In one implementation of the present disclosure, the DCI includes a physical layer transmission parameter of the uplink grant resource, a second mapping relationship is stored in the UE, the second mapping relationship is a mapping relationship between virtual transmission profile identifiers and target physical layer transmission parameter sets, the target physical layer transmission parameter sets correspond to transmission profiles of target resources.

The transmitting module 502 is used for determining the uplink grant resource as the target resource when the DCI includes virtual indication information corresponding to the uplink grant resource, wherein the virtual indication information is used for instructing the UE to acquire a virtual transmission profile identifier corresponding to the uplink grant resource according to the physical layer transmission parameter of the uplink grant resource and the second mapping relationship.

Configuration information of each target logical channel in the UE includes a virtual transmission profile identifier, and the transmitting module 502 is used for: acquiring a virtual transmission profile identifier corresponding to the uplink grant resource based on the physical layer transmission parameter of the uplink grant resource and the second mapping relationship according to the virtual indication information; determining a target logical channel corresponding to the uplink grant resource according to the virtual transmission profile identifier corresponding to the uplink grant resource and the configuration information of each target logical channel in the UE; and preferentially using the uplink grant resource to transmit data in the target logical channel corresponding to the uplink grant resource.

The receiving module 501 is further used for receiving the second mapping relationship sent by the base station through an RRC signaling and the configuration information of each target logical channel in the UE.

In one implementation of the present disclosure, the base station configures a priority for each logical channel in the UE, a priority configured by the base station for a target logical channel is the highest priority, a quantity of the first logical channels is greater than or equal to one, the transmitting module 502 is used for: acquiring a priority of each logical channel in the first logical channels; when a logical channel configured with the highest priority exists in the first logical channels, determining the uplink grant resource as the target resource; preferentially using the uplink grant resource to transmit data of the logical channel configured with the highest priority.

The receiving module 501 is further used for receiving a priority of each logical channel in the UE sent by the base station through an RRC signaling.

In one implementation of the present disclosure, the base station configures a priority and a priority bit rate (PBR) for each logical channel in the UE, and a priority configured by the base station for a target logical channel is the highest priority, a configured PBR is infinite, and a quantity of the first logical channels is greater than or equal to one.

The transmitting module 502 is used for obtaining a priority and a PBR of each logical channel in the first logical channels, and determining the uplink grant resource as the target resource when there is a logical channel configured with the highest priority and infinite PBR in the first logical channels.

The transmitting module 502 is used for: acquiring a Bucket Size Duration (BSD) of each logical channel in the first logical channels; and according to a priority, a PBR, and a BSD of each logical channel of the first logical channels, using the uplink grant resource to transmit data of the first logical channels.

The receiving module 501 is further used for receiving a priority, a PBR, and a BSD of each logical channel in the UE sent by the base station through an RRC signaling.

In one implementation of the present disclosure, when the first logical channels include a target logical channel, the transmitting module 502 is used for: determining a size of the uplink grant resource; when the size of the uplink grant resource is less than a data amount of data in the target logical channel, acquiring target data from the data in the target logical channel and transmitting the target data using the uplink grant resource, wherein the data amount of the target data is equal to the size of the uplink grant resource; and when the size of the uplink grant resource is greater than or equal to the data amount of data in the target logical channel, transmitting all data in the target logical channel using the uplink grant resource.

The transmitting module 502 is used for determining at least one remaining logical channel when a size of the uplink grant resource is greater than a data amount of data in the target logical channel, wherein the remaining logical channel is a logical channel other than the target logical channel in the first logical channels, acquiring a priority, a PBR, and a BSD of each remaining logical channel in the at least one remaining logical channel, and transmitting data in the remaining logical channel when transmitting all data in the target logical channel using the uplink grant resource according to the priority, the PBR, and the BSD of the each remaining logical channel.

In one implementation of the present disclosure, when the first logical channels include at least two target logical channels, the transmitting module 502 is used for: acquiring a priority, a priority bit rate (PBR), and a Bucket Size Duration (BSD) of each target logical channel in the at least two target logical channels; and according to the priority, the PBR, and the BSD of each of the target logical channels, transmitting data in the at least two target logical channels using the uplink grant resource until the data in the at least two target logical channels are all transmitted through the uplink grant resource, or until the uplink grant resource is all occupied by the data in the at least two target logical channels.

In summary, the UE according to the implementation of the present disclosure preferentially uses an uplink grant resource to transmit data of a target logical channel when the uplink grant resource allocated by a base station to the UE is a target resource, the target logical channel is a logical channel configured with only one transmission profile, and the target resource is an uplink grant resource with the same transmission profile as that configured for the target logical channel, so that data in the logical channel which is configured with only one transmission profile and can be carried by only one type of uplink grant resource, may be preferentially transmitted, thereby ensuring Quality of Service (QoS) of services corresponding to the logical channel which can be carried by only one type of uplink grant resource.

Figure 6:
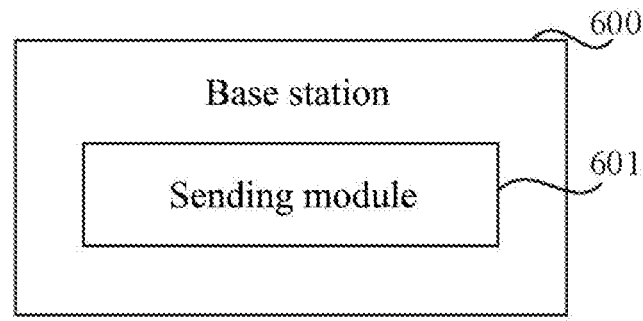
FIG. 6 is a block diagram of a base station according to an implementation of the present disclosure.

FIG. 6 is a block diagram of a base station 60 according to an implementation of the present disclosure. As shown in FIG. 6, the base station 60 includes a transmitting module 601.

The sending module 601 is used for sending downlink control information (DCI) to a User Equipment (UE), wherein the DCI is used for identifying an uplink grant resource allocated to the UE by the base station, the uplink grant resource corresponds to a transmission profile, the uplink grant resource is used for carrying data of first logical channels, and transmission profiles configured for the first logical channels include the transmission profile corresponding to the uplink grant resource.

The DCI is used for instructing the UE to preferentially use the uplink grant resource to transmit data of a target logical channel in the first logical channels when the uplink grant resource is a target resource, wherein the target logical channel is a logical channel configured with only one transmission profile, and the target resource is an uplink grant resource with a corresponding transmission profile being the same as a transmission profile configured for the target logical channel.

In one implementation of the present disclosure, the DCI includes a channel identifier corresponding to the uplink grant resource, and the channel identifier is used for identifying a target logical channel.

In one implementation of the present disclosure, the DCI includes a physical layer transmission parameter of the uplink grant resource.

In one implementation of the present disclosure, the transmission profile corresponds to a physical layer transmission parameter set including at least one of TTI lengths, a set of basic parameters, and carrier frequencies.

In one implementation of the present disclosure, the sending module 501 is further used for: sending a first mapping relationship and configuration information of each logical channel in the UE to the UE through a radio resource control (RRC) signaling, wherein the first mapping relationship is a mapping relationship between transmission profile identifiers and physical layer transmission parameter sets, and the configuration information of each logical channel in the UE includes a transmission profile identifier.

In one implementation of the present disclosure, the sending module 501 is further used for: sending a second mapping relationship and configuration information of each target logical channel in the UE to the UE through a radio resource control (RRC) signaling, wherein the second mapping relationship is a mapping relationship between virtual transmission profile identifiers and target physical layer transmission parameter sets, the target physical layer transmission parameter sets correspond to transmission profiles of target resources, and the configuration information of each target logical channel in the UE includes a virtual transmission profile identifier.

In one implementation of the present disclosure, the sending module 501 is further used for: sending a priority, a priority bit rate (PBR), and a Bucket Size Duration (BSD) of each logical channel in the UE to the UE through a radio resource control (RRC) signaling.

In summary, the base station according to the implementation of the present disclosure sends DCI to a UE, and when an uplink grant resource allocated by a base station to a User Equipment (UE) is a target resource, the DCI instructs the UE to preferentially use the uplink grant resource to transmit data of a target logical channel, the target logical channel is a logical channel configured with only one transmission profile, and the target resource is an uplink grant resource with the same transmission profile as that configured for the target logical channel, so that data in the logical channel which is configured with only one transmission profile and can be carried by only one type of uplink grant resource, may be preferentially transmitted, thereby ensuring Quality of Service (QoS) of services corresponding to the logical channel which can be carried by only one type of uplink grant resource.

Figure 7:
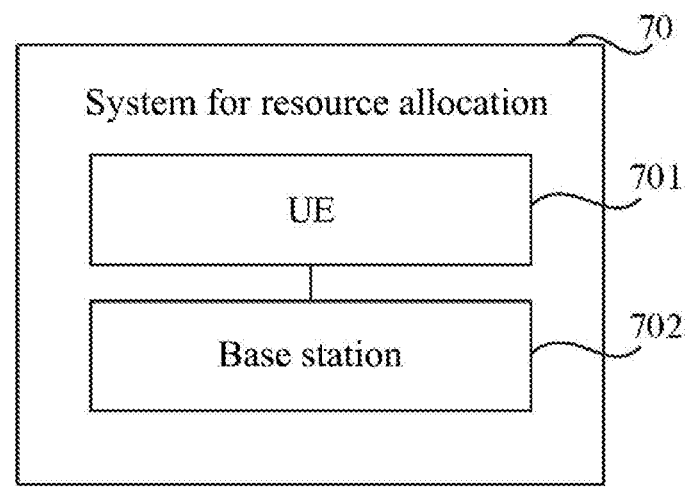
FIG. 7 is a block diagram of a system for resource allocation according to an implementation of the present disclosure.

FIG. 7 is a block diagram of a system 70 for resource allocation according to an implementation of the present disclosure. As shown in FIG. 7, the system 70 for resource allocation includes a UE 701 as shown in FIG. 5 and a base station 702 as shown in FIG. 6.

Figure 8:
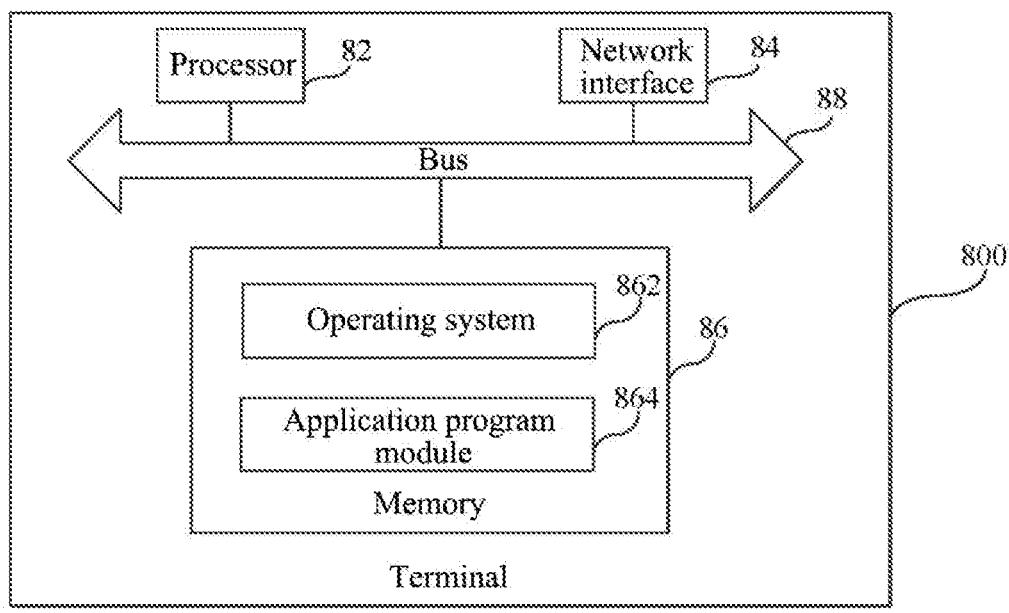
FIG. 8 is a block diagram of a terminal according to an implementation of the present disclosure.

Refer to FIG. 8, which shows a block diagram of a terminal 800 according to an example implementation of the present disclosure. The terminal 800 includes a processor 82 and a network interface 84.

The processor 82 includes one or more processing cores. The processor 82 executes various functional applications and data processing by running software programs and modules.

There may be multiple network interfaces 84 for communicating with other storage devices or network devices.

Optionally, the terminal 800 also includes components such as a memory 86, a bus 88, etc. The memory 86 and the network interface 84 are respectively connected to the processor 82 through a bus 88.

The memory 86 may be used for storing software programs and modules.

Specifically, the memory 86 may store an operating system 862 and an application program module 864 required for at least one function. The operating system 862 may be an operating system such as a Real Time eXecutive (RTX), LINUX, UNIX, WINDOWS, or OS X.

In some implementations, the network interface 84 may be a transceiver antenna (which may be considered a transmitter and a receiver).

In an example implementation, the implementation of the present disclosure also provides a non-transitory computer readable storage medium including instructions, such as the memory 86 including instructions, which may be executed by the processor 82 of the terminal 800 to complete the above method for resource allocation. For example, the non-transitory computer readable storage medium may be a ROM, a random access memory (RAM), a CD-ROM, a magnetic tape, a floppy disk, an optical data storage device, etc.

Figure 9:
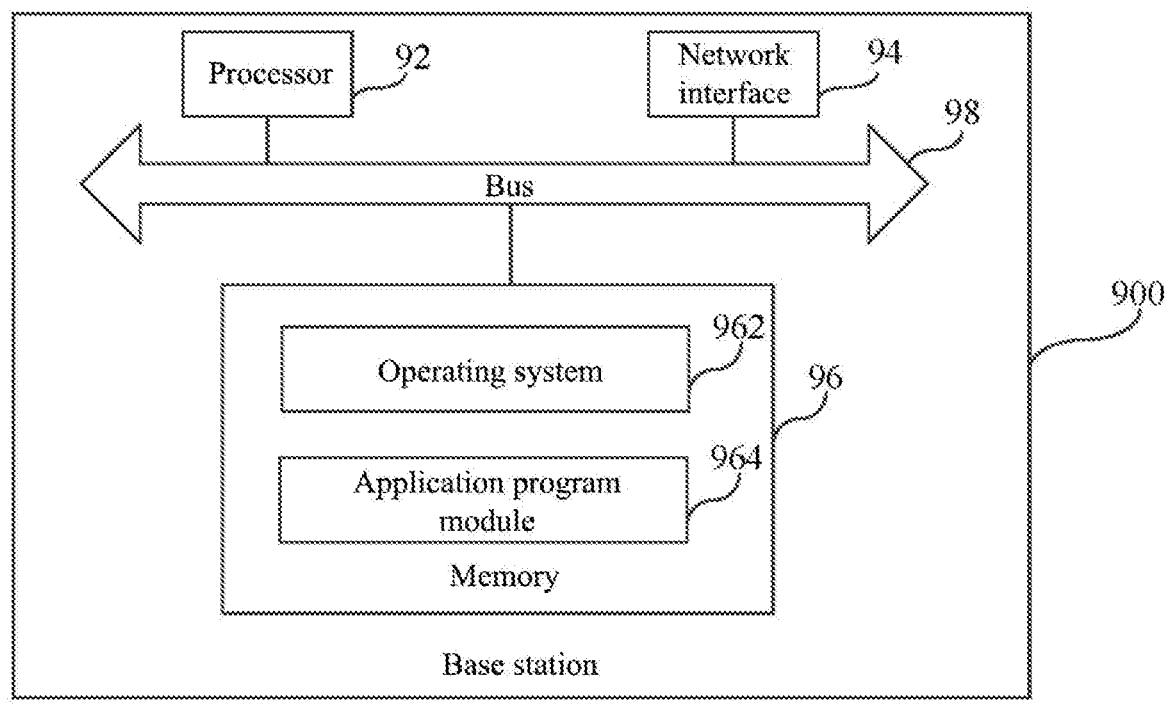
FIG. 9 is a block diagram of a base station according to an implementation of the present disclosure.

Refer to FIG. 9, which shows a block diagram of a base station 900 according to an example implementation of the present disclosure. The base station 900 includes a processor 92 and a network interface 94.

The processor 92 includes one or more processing cores. The processor 92 executes various functional applications and data processing by running software programs and modules.

There may be multiple network interfaces 94 for communicating with other storage devices or network devices.

Optionally, the base station 900 further includes a memory 96, a bus 98, etc. The memory 96 and the network interface 94 are respectively connected to the processor 92 through a bus 98.

The memory 96 may be used for storing software programs and modules. Specifically, the memory 96 may store an operating system 962 and an application program module 964 required for at least one function. The operating system 962 may be an operating system such as a Real Time eXecutive (RTX), LINUX, UNIX, WINDOWS, or OS X.

In some implementations, the network interface 94 may be a transceiver antenna (which may be considered a transmitter and a receiver).

In an example implementation, the implementation of the present disclosure also provides a non-transitory computer readable storage medium including instructions, such as a memory 96 including instructions, which may be executed by the processor 92 of the base station 900 to complete the above method for resource allocation. For example, the non-transitory computer readable storage medium may be a ROM, a random access memory (RAM), a CD-ROM, a magnetic tape, a floppy disk, an optical data storage device, etc.

In an example implementation, there is also provided a computer readable storage medium, which may be a non-transitory storage medium having a computer program stored therein, capable of executing a wireless communication method when the computer program in the computer readable storage medium is executed by a processor, for example, the method may include: receiving downlink control information (DCI) sent by a base station, the DCI is used for identifying an uplink grant resource allocated by the base station to a User Equipment (UE), the uplink grant resource corresponds to a transmission profile, the uplink grant resource is used for carrying data of first logical channels, and transmission profiles configured for the first logical channels include the transmission profile corresponding to the uplink grant resource; when the uplink grant resource is a target resource, the uplink grant resource is preferentially used for transmitting data of a target logical channel in the first logical channels; the target logical channel is a logical channel configured with only one transmission profile, and the target resource is an uplink grant resource with a transmission profile that is the same as that configured for the target logical channel, or the method may include: sending DCI to a UE, the DCI is used for identifying an uplink grant resource allocated to the UE by a base station, the uplink grant resource correspond to one transmission profile, the uplink grant resource is used for carrying data of first logical channels, and transmission profiles configured for first logical channels include the transmission profile corresponding to the uplink grant resource; the DCI is used for instructing the UE to preferentially using the uplink grant resource to transmit data of a target logical channel in the first logical channels when the uplink grant resource is a target resource; wherein the target logical channel is a logical channel configured with only one transmission profile, and the target resource is an uplink grant resource with a transmission profile that is the same as that configured for the target logical channel.

In the example implementation, there is also provided a computer program product containing instructions that, when running on a terminal, enable the terminal to execute the method for resource allocation executed by the UE in the above implementations, or enable a base station to implement the method for resource allocation executed by the base station in the above implementations when running on the base station.

Those skilled in the art may clearly understand that for convenience and conciseness of description, specific working processes of systems, apparatuses and units described above may refer to the corresponding processes in the method implementations, and details are not described herein again.

One of ordinary skill in the art may understand that all or part of the acts for implementing the implementations may be completed through hardware, or related hardware may be instructed by programs, which may be stored in a computer readable storage medium, which may be a read-only memory, a magnetic disk, or an optical disk, etc.

The description is only a preferred implementation of the present disclosure and is not intended to limit the present disclosure. Any modification, equivalent substitution, improvement, etc. made within the spirit and principles of the present disclosure shall be included within the scope of protection of the present disclosure.

What is claimed is:

1. A method for resource allocation, comprising:
   receiving downlink control information (DCI) sent by a base station, wherein the DCI is used for identifying an uplink grant resource allocated by the base station to a User Equipment (UE), the uplink grant resource corresponds to a transmission profile, the uplink grant resource is used for carrying first data of first logical channels, and transmission profiles configured for the first logical channels comprise the transmission profile corresponding to the uplink grant resource;
   when the uplink grant resource is a target resource, preferentially using the uplink grant resource to transmit second data of a target logical channel in the first logical channels, wherein the target logical channel is a logical channel configured with only one transmission profile, and the target resource is an uplink grant resource with a corresponding transmission profile being the same as a transmission profile configured for the target logical channel; and determining that the uplink grant resource is the target resource when a channel identifier corresponding to the uplink grant resource is included in the DCI; wherein the channel identifier is used for identifying the target logical channel, wherein the preferentially using the uplink grant resource to transmit second data of a target logical channel in the first logical channels comprises:

preferentially using the uplink grant resource to transmit the second data in the target logical channel identified by the channel identifier.

2. The method according to claim 1, wherein the DCI comprises a physical layer transmission parameter of the uplink grant resource, and the method further comprises:

acquiring the physical layer transmission parameter of the uplink grant resource according to the DCI; and determining whether the uplink grant resource is the target resource based on the physical layer transmission parameter of the uplink grant resource.

3. The method according to claim 2, wherein the transmission profile corresponds to a physical layer transmission parameter set, a first mapping relationship is stored in the UE, the first mapping relationship is a mapping relationship between transmission profile identifiers and physical layer transmission parameter sets, configuration information of each logical channel in the UE comprises a transmission profile identifier, and the determining whether the uplink grant resource is the target resource based on the physical layer transmission parameter of the uplink grant resource comprises:

acquiring a transmission profile identifier corresponding to the uplink grant resource based on the physical layer transmission parameter of the uplink grant resource and the first mapping relationship;

acquiring a logical channel corresponding to the uplink grant resource based on the transmission profile identifier corresponding to the uplink grant resource and the configuration information of each logical channel in the UE;

determining whether the logical channel corresponding to the uplink grant resource comprises a target logical channel; and when the logical channel corresponding to the uplink grant resource comprises a target logical channel, determining the uplink grant resource to be the target resource.

4. The method according to claim 3, wherein the preferentially using the uplink grant resource to transmit the second data of a target logical channel in the first logical channels comprises:

preferentially using the uplink grant resource to transmit the second data in a target logical channel corresponding to the uplink grant resource.

5. The method according to claim 3, wherein the method further comprises:

receiving the first mapping relationship and the configuration information of each logical channel in the UE sent by the base station through a radio resource control (RRC) signaling.

6. The method according to claim 3, wherein the physical layer transmission parameter set comprises at least one of a set of basic parameters, transmission time interval (TTI) lengths, or carrier frequencies.

7. A non-transitory computer readable storage medium, wherein the non-transitory computer readable storage medium stores a computer program, and when the computer program is executed by a processor, the processor implements the method for resource allocation according to claim 1.

8. A User Equipment (UE), comprising a network interface and a processor, wherein, the network interface is configured to receive downlink control information (DCI) sent by a base station, wherein the DCI is used for identifying an uplink grant resource allocated to the UE by the base station, the uplink grant resource corresponds to a transmission profile, the uplink grant resource is used for carrying first data of first logical channels, and transmission profiles configured for the first logical channels comprise the transmission profile corresponding to the uplink grant resource;

the processor is configured to preferentially use the uplink grant resource to transmit second data of a target logical channel in the first logical channels when the uplink grant resource is a target resource, wherein the target logical channel is a logical channel configured with only one transmission profile, and the target resource is an uplink grant resource with a corresponding transmission profile being the same as a transmission profile configured for the target logical channel;

the processor is further configured to determine that the uplink grant resource is the target resource when a channel identifier corresponding to the uplink grant resource is included in the DCI, the channel identifier is used for identifying a target logical channel; and the processor is further configured to preferentially use the uplink grant resource to transmit the second data in the target logical channel identified by the channel identifier.

9. The UE according to claim 8, wherein the DCI comprises a physical layer transmission parameter of the uplink grant resource, and the processor is configured to:

acquire the physical layer transmission parameter of the uplink grant resource according to the DCI; and determine whether the uplink grant resource is the target resource based on the physical layer transmission parameter of the uplink grant resource.

10. The UE according to claim 9, wherein the transmission profile corresponds to a physical layer transmission parameter set, a first mapping relationship is stored in the UE, the first mapping relationship is a mapping relationship between transmission profile identifiers and physical layer transmission parameter sets, configuration information of each logical channel in the UE comprises a transmission profile identifier, and the processor is configured to:

acquire a transmission profile identifier corresponding to the uplink grant resource based on the physical layer transmission parameter of the uplink grant resource and the first mapping relationship;

acquire a logical channel corresponding to the uplink grant resource based on the transmission profile identifier corresponding to the uplink grant resource and the configuration information of each logical channel in the UE;

determine whether the logical channel corresponding to the uplink grant resource comprises a target logical channel; and when the logical channel corresponding to the uplink grant resource comprises a target logical channel, determine the uplink grant resource to be the target resource.

11. The UE according to claim 10, wherein the processor is configured to:
preferentially use the uplink grant resource to transmit the second data in the target logical channel corresponding to the uplink grant resource.

12. The UE according to claim 10, wherein the network interface is further configured to:
receive the first mapping relationship and the configuration information of each logical channel in the UE sent by the base station through a radio resource control (RRC) signaling.

13. The UE according to claim 10, wherein the physical layer transmission parameter set comprises at least one of a set of basic parameters, transmission time interval (TTI) lengths, or carrier frequencies.

14. The UE according to claim 8, wherein the transmission profile corresponds to a physical layer transmission parameter set, the DCI comprises a physical layer transmission parameter of the uplink grant resource, a second mapping relationship is stored in the UE, the second mapping relationship is a mapping relationship between virtual transmission profile identifiers and target physical layer transmission parameter sets, the target physical layer transmission parameter sets correspond to transmission profiles of target resources, and the processor is configured to:
determine the uplink grant resource as the target resource when virtual indication information corresponding to the uplink grant resource is included in the DCI;
wherein the virtual indication information is used for instructing the UE to acquire a virtual transmission profile identifier corresponding to the uplink grant resource according to the physical layer transmission parameter of the uplink grant resource and the second mapping relationship.

15. The UE according to claim 14, wherein configuration information of each target logical channel in the UE comprises a virtual transmission profile identifier, and the processor is configured to:
acquire a virtual transmission profile identifier corresponding to the uplink grant resource based on the physical layer transmission parameter of the uplink grant resource and the second mapping relationship according to the virtual indication information;
determine a target logical channel corresponding to the uplink grant resource according to the virtual transmission profile identifier corresponding to the uplink grant resource and the configuration information of each target logical channel in the UE; and
preferentially use the uplink grant resource to transmit the second data in the target logical channel corresponding to the uplink grant resource.

16. The UE according to claim 15, wherein the network interface is further configured to:
receive the second mapping relationship and the configuration information of each target logical channel in the UE sent by the base station through a radio resource control (RRC) signaling.

\* \* \* \* \*

UNITED STATES PATENT AND TRADEMARK OFFICE
CERTIFICATE OF CORRECTION

| | |
|---|---|
| PATENT NO. | : 11,277,828 B2 |
| APPLICATION NO. | : 16/631771 |
| DATED | : March 15, 2022 |
| INVENTOR(S) | : Tang |

Page 1 of 1

It is certified that error appears in the above-identified patent and that said Letters Patent is hereby corrected as shown below:

On the Title Page

Item (73) Assignees:
Please delete "GUANGDONG OPPO MOBILE, Dongguan (CN);
TELECOMMUNICATIONS CORP., LTD., Dongguan (CN)"
And insert -- GUANGDONG OPPO MOBILE TELECOMMUNICATIONS CORP., LTD.,
Dongguan (CN) --

Signed and Sealed this
Seventeenth Day of May, 2022

Katherine Kelly Vidal
*Director of the United States Patent and Trademark Office*